(12) United States Patent
Koravadi (10) Patent No.: US 10,347,129 B2
(45) Date of Patent: Jul. 9, 2019

(54) VEHICLE SYSTEM WITH TRUCK TURN ALERT

(71) Applicant: MAGNA ELECTRONICS INC., Auburn Hills, MI (US)

(72) Inventor: Krishna Koravadi, Rochester Hills, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 15/832,801

(22) Filed: Dec. 6, 2017

(65) Prior Publication Data

US 2018/0158337 A1 Jun. 7, 2018

Related U.S. Application Data

(60) Provisional application No. 62/431,083, filed on Dec. 7, 2016.

(51) Int. Cl.
| | |
|---|---|
| *G08G 1/16* | (2006.01) |
| *G08G 1/01* | (2006.01) |
| *G05D 1/02* | (2006.01) |
| *G06K 9/00* | (2006.01) |
| *B60R 11/04* | (2006.01) |

(Continued)

(52) U.S. Cl.
CPC ............ *G08G 1/162* (2013.01); *B60R 11/04* (2013.01); *B60W 50/00* (2013.01); *B62D 15/0265* (2013.01); *G05D 1/0238* (2013.01); *G05D 1/0253* (2013.01); *G05D 1/0289* (2013.01); *G06K 9/00805* (2013.01); *G08G 1/0112* (2013.01); *G08G 1/09626* (2013.01); *G08G 1/166* (2013.01); *B60R 2300/301* (2013.01); *B60R 2300/406* (2013.01); *B60R 2300/8066* (2013.01); *B60R 2300/8086* (2013.01); *B60R 2300/8093* (2013.01); *G05D 2201/0213* (2013.01); *G08G 1/04* (2013.01)

(58) Field of Classification Search
CPC ........ G08G 1/162; G08G 1/0112; G08G 1/04; G08G 1/09626; G08G 1/166; B60R 11/04; B60W 50/00; B62D 15/0265; G05D 1/0258; G06K 9/00805
USPC ........................................................ 340/465
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |

(Continued)

*Primary Examiner* — Jack K Wang
(74) *Attorney, Agent, or Firm* — Honigman LLP (57) ABSTRACT

A communication system for vehicles includes a first communication device disposed at a first vehicle and a second communication device disposed at a second vehicle. The first communication device wirelessly transmitting data indicative of a predicted path of travel of the first vehicle, and the second communication device receives the transmitted data from the first communication device. A control of the second vehicle processes data received from the first communication device and data indicative of a predicted path of travel of the second vehicle to determine a potential collision between the first vehicle and the second vehicle during a turning maneuver of one of the first and second vehicles toward the other of the first and second vehicles. Responsive to determination of a likelihood of collision between the first vehicle and the second vehicle, the control generates an alert to a driver of the second vehicle.

20 Claims, 6 Drawing Sheets

(51) Int. Cl.
*B60W 50/00* (2006.01)
*B62D 15/02* (2006.01)
*G08G 1/0962* (2006.01)
*G08G 1/04* (2006.01)

(56) References Cited

U.S. PATENT DOCUMENTS

| | | | |
|---|---|---|---|
| 5,949,331 A | 9/1999 | Schofield et al. | |
| 6,587,186 B2 | 7/2003 | Bamji et al. | |
| 6,674,895 B2 | 1/2004 | Rafii et al. | |
| 6,678,039 B2 | 1/2004 | Charbon | |
| 6,690,268 B2 | 2/2004 | Schofield et al. | |
| 6,690,354 B2 | 2/2004 | Sze | |
| 6,693,517 B2 | 2/2004 | McCarthy et al. | |
| 6,710,770 B2 | 3/2004 | Tomasi et al. | |
| 6,825,455 B1 | 11/2004 | Schwarte | |
| 6,876,775 B2 | 4/2005 | Torunoglu | |
| 6,906,793 B2 | 6/2005 | Bamji et al. | |
| 6,919,549 B2 | 7/2005 | Bamji et al. | |
| 7,038,577 B2 | 5/2006 | Pawlicki et al. | |
| 7,053,357 B2 | 5/2006 | Schwarte | |
| 7,124,027 B1* | 10/2006 | Ernst, Jr. | B60W 30/09 701/301 |
| 7,157,685 B2 | 1/2007 | Bamji et al. | |
| 7,176,438 B2 | 2/2007 | Bamji et al. | |
| 7,203,356 B2 | 4/2007 | Gokturk et al. | |
| 7,212,663 B2 | 5/2007 | Tomasi | |
| 7,283,213 B2 | 10/2007 | O'Connor et al. | |
| 7,310,431 B2 | 12/2007 | Gokturk et al. | |
| 7,321,111 B2 | 1/2008 | Bamji et al. | |
| 7,340,077 B2 | 3/2008 | Gokturk et al. | |
| 7,352,454 B2 | 4/2008 | Bamji et al. | |
| 7,375,803 B1 | 5/2008 | Bamji | |
| 7,379,100 B2 | 5/2008 | Gokturk et al. | |
| 7,379,163 B2 | 5/2008 | Rafii et al. | |
| 7,405,812 B1 | 7/2008 | Bamji | |
| 7,408,627 B2 | 8/2008 | Bamji et al. | |
| 7,425,889 B2* | 9/2008 | Widmann | B60R 1/003 340/425.5 |
| 7,580,795 B2 | 8/2009 | McCarthy et al. | |
| 7,720,580 B2 | 5/2010 | Higgins-Luthman | |
| 7,855,755 B2 | 12/2010 | Weller et al. | |
| 8,013,780 B2 | 9/2011 | Lynam | |
| 8,027,029 B2 | 9/2011 | Lu et al. | |
| 10,046,800 B2* | 8/2018 | Hu | B60R 11/04 |
| 2005/0000738 A1* | 1/2005 | Gehring | B62D 13/06 180/14.1 |
| 2006/0244579 A1* | 11/2006 | Raab | B60T 8/1708 340/438 |
| 2007/0067081 A1* | 3/2007 | Ton | B60Q 9/008 701/41 |
| 2009/0072956 A1* | 3/2009 | Kalous | B60Q 1/305 340/431 |
| 2010/0245066 A1 | 9/2010 | Sarioglu et al. | |
| 2011/0298603 A1* | 12/2011 | King | G08G 1/042 340/436 |
| 2012/0062743 A1 | 3/2012 | Lynam et al. | |
| 2012/0218412 A1 | 8/2012 | Dellantoni et al. | |
| 2013/0222592 A1 | 8/2013 | Gieseke | |
| 2014/0172239 A1* | 6/2014 | Vergara | B60Q 1/24 701/49 |
| 2014/0218529 A1 | 8/2014 | Mahmoud et al. | |
| 2014/0375476 A1 | 12/2014 | Johnson et al. | |
| 2015/0124096 A1 | 5/2015 | Koravadi | |
| 2015/0158499 A1 | 6/2015 | Koravadi | |
| 2015/0203026 A1* | 7/2015 | Schotanus | B60Q 1/24 362/520 |
| 2015/0251599 A1 | 9/2015 | Koravadi | |
| 2015/0344030 A1* | 12/2015 | Damerow | B60W 30/0956 701/1 |
| 2015/0352953 A1 | 12/2015 | Koravadi | |
| 2016/0036917 A1 | 2/2016 | Koravadi et al. | |
| 2016/0210853 A1 | 7/2016 | Koravadi | |
| 2017/0113683 A1* | 4/2017 | Mudalige | B60W 30/08 |
| 2017/0158133 A1 | 6/2017 | Chundrlik, Jr. et al. | |
| 2017/0254873 A1 | 9/2017 | Koravadi | |
| 2018/0024564 A1* | 1/2018 | Matsuda | B60R 21/00 701/25 |
| 2018/0053413 A1* | 2/2018 | Patil | G01S 11/14 |
| 2018/0105182 A1* | 4/2018 | Kim | B60W 50/00 |
| 2018/0127024 A1* | 5/2018 | Pourrezaei Khaligh | B60D 1/246 |

\* cited by examiner

VEHICLE SYSTEM WITH TRUCK TURN ALERT

CROSS REFERENCE TO RELATED APPLICATION

The present application claims the filing benefits of U.S. provisional application Ser. No. 62/431,083, filed Dec. 7, 2016, which is hereby incorporated herein by reference in its entirety.

FIELD OF THE INVENTION

The present invention relates generally to a sensing or communication system for a vehicle and, more particularly, to a vehicle sensing or communication system that utilizes one or more sensors at a vehicle and that utilizes a communication device to communicate with other vehicles.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

Recently developed Dedicated Short Range Communication (DSRC) radio technology (as known in the art) enables communications-based active safety systems. Communication links for such applications need to be reliable, high speed, low latency links that are immune to extreme weather conditions and that work reliably in high speed mobility conditions and multipath roadway environments.

In 2012, there were 3,921 people killed and 104,000 people injured in crashes involving large trucks. In the United States, 333,000 large trucks were involved in traffic crashes during 2012. According to many insurance carriers, in over 90 percent of right turn squeeze situations, either the truck driver is cited for unsafe turning or even without a citation issued, the trucking company still must pay for the damage to the other vehicle. Because of the length of the truck, if the truck driver or the other vehicle driver misjudge the path of travel of the inside tire, the vehicles end up in a crash. Right turns are typically a problem for trucks. Accidents can occur when other vehicles squeeze into the area along the right side of the truck. The other vehicle may be attempting to pass on the right or make a right turn inside of the turn of the truck.

SUMMARY OF THE INVENTION

The present invention provides a driver assistance system for a vehicle that utilizes one or more sensors (such as a camera of the vehicle) and uses a dedicated short range communication (DSRC) radio of the vehicle to communicate to a DSRC radio of another vehicle. The communication system for vehicles comprises a first communication device disposed at a first vehicle and wirelessly transmitting data indicative of a path of travel of the first vehicle, and a second communication device disposed at a second vehicle and receiving the transmitted data from the first communication device of the first vehicle. A control is operable to process data received from the first communication device and data indicative of a projected path of travel of the second vehicle to determine a potential collision between the first and second vehicles. Responsive to determination of a likelihood of collision between the first and second vehicles, the control generates an alert to a driver of the second vehicle.

Optionally, the first vehicle may be a truck and the second vehicle may be a vehicle or car at or near the truck when the truck is about to commence a turning maneuver. Optionally, the second vehicle may be a truck and the first vehicle may be a vehicle or car at or near the truck when the truck is about to commence a turning maneuver.

These and other objects, advantages, purposes and features of the present invention will become apparent upon review of the following specification in conjunction with the drawings.

LEGEND

100—Truck equipped with 101
101—DSRC radio with turn alert and brake system installed in the truck
102—Path of the truck inner tire
103—DSRC radio with turn alert and brake system installed in the car
104—Car equipped with 103
105—DSRC antenna part of 101
106—DSRC radio part of 101
107—Electronic Control Unit (ECU) part of 101
108—Human Machine Interface (HMI) part of 101
109—Brake control module part of 101
110—Steering control module part of 101
111—DSRC antenna part of 103
112—DSRC radio part of 103
113—Electronic Control Unit (ECU)
114a—HMI module part of 103
114b—Brake module part of 103
114c—Steering module part of 103
115—Windshield camera module part of 103
116—Car data via DSRC radio module
117—Target Object Selection module
118—Truck data from vehicle bus
119—Collision probability estimation, alert or braking determination part of car
120—Truck path prediction module
121—Truck data via DSRC radio & camera data 122—Car data via CAN or Flexray etc.
123—Car path prediction
124—Collision probability estimation, alert or braking determination part of the truck system

DESCRIPTION OF THE PREFERRED EMBODIMENTS

A vehicle driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
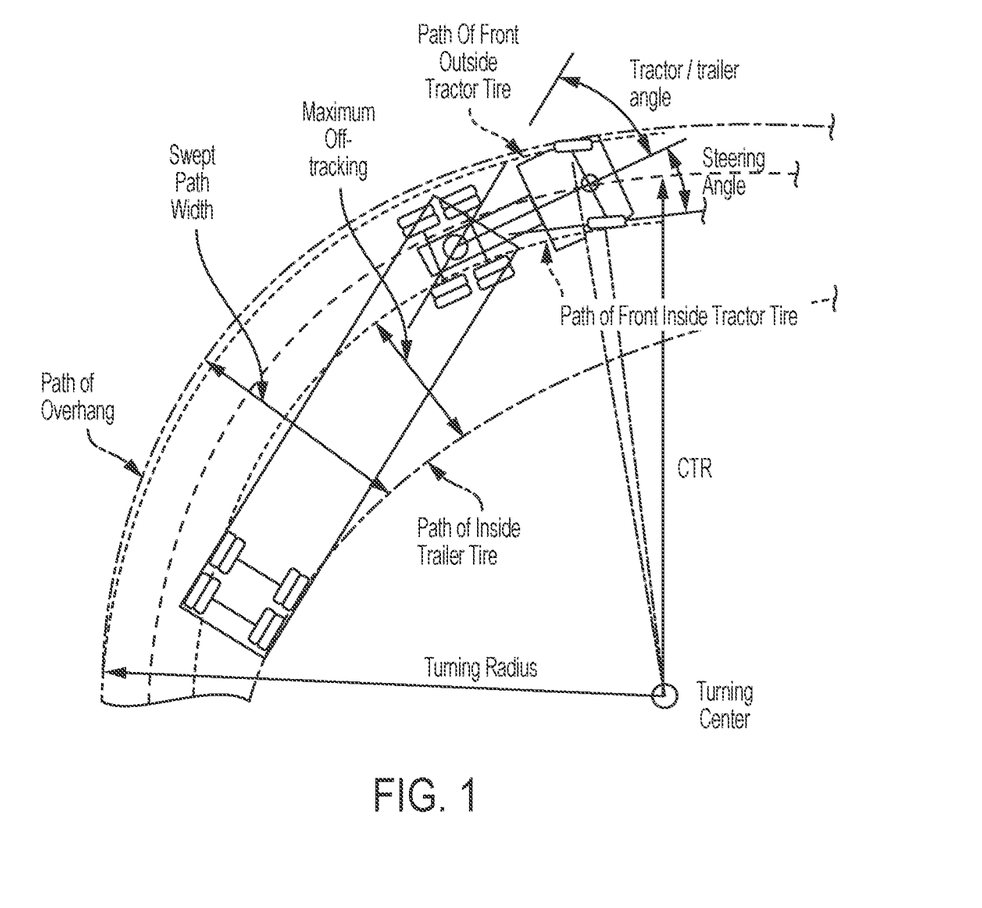
FIG. 1 is a schematic of a truck wheel path of the inside tire during a turning maneuver of a truck.
Figure 2:
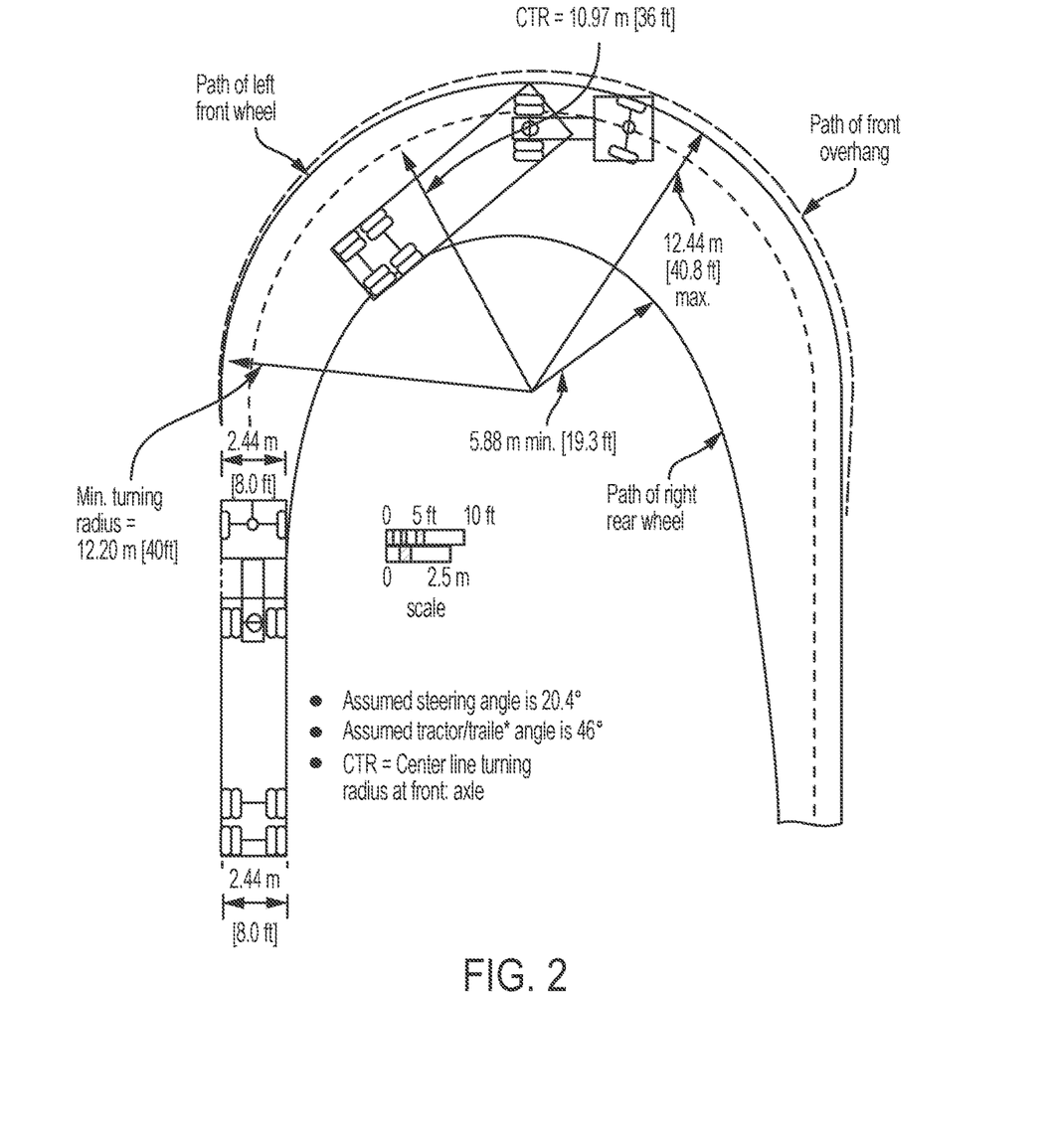
FIG. 2 is a schematic showing a truck outer wheel overhang path during a turning maneuver of a truck.

The present invention provides an alert or vehicle control system that functions to reduce or avoid collisions between a truck and a vehicle or car, such as when a truck is making a right hand turn with the other vehicle at the right side of the truck or in the street onto which the truck is turning. Because of the length of the truck, during a turn the inside tire of the truck takes the path as shown in FIGS. 1 and 2, and if the truck driver or other vehicle driver misjudge the path of travel of the inside tire, the vehicles may collide. In the U.S., right turns are a frequent problem for trucks, and accidents can occur when other vehicles squeeze into the area along the right side of the truck. The other vehicle may be attempting to pass on the right or make a right turn inside of the turn of the truck.

The present invention is applicable to trucks, such as are used for transporting freight. A truck, as the term is used herein, comprises tractor-trailer trucks or semi-trucks (having a cab and a multi-axle trailer) classified in Class 7, 8 or 9 (U.S. Commercial Truck GVWR classifications). Thus, as an example, a truck (as the term is used herein) may comprise a Class 8 tractor-trailer or "18-wheeler" truck having a gross vehicle weight rating above 33,000 lbs.

Referring now to the drawings and the illustrative embodiments depicted therein, a truck 100 (FIG. 3), such as a semi-truck with a long trailer, is equipped with a communication system 101 with a turn alert and a brake system control module. The communication system 101 includes a DSRC radio 106 and a DSRC antenna 105, with the DSRC radio 106 communicating with an Electronic Control Unit (ECU) 107. The ECU 107 is in communication (such as wired or wireless communication) with a vehicle bus of the truck 100, and communicates with a Human Machine Interface (HMI) 108, a brake control module 109 and a steering control module 110 of the communication system 101.

Figure 4:
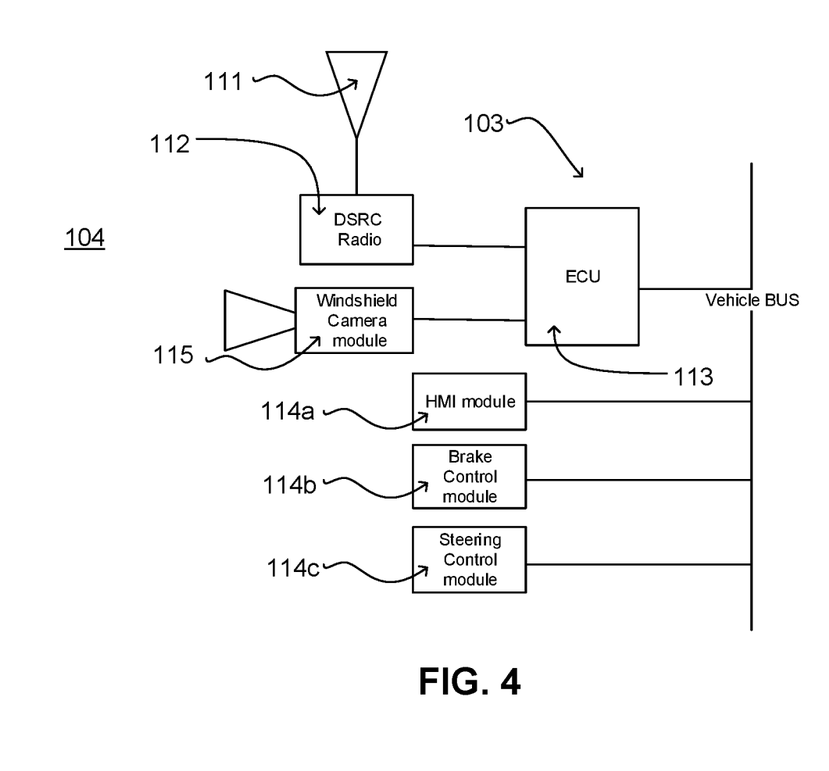
FIG. 4 is a block diagram showing a communication system having a DSRC radio with turn alert and brake system control installed in a vehicle in accordance with the present invention.
Figure 5:
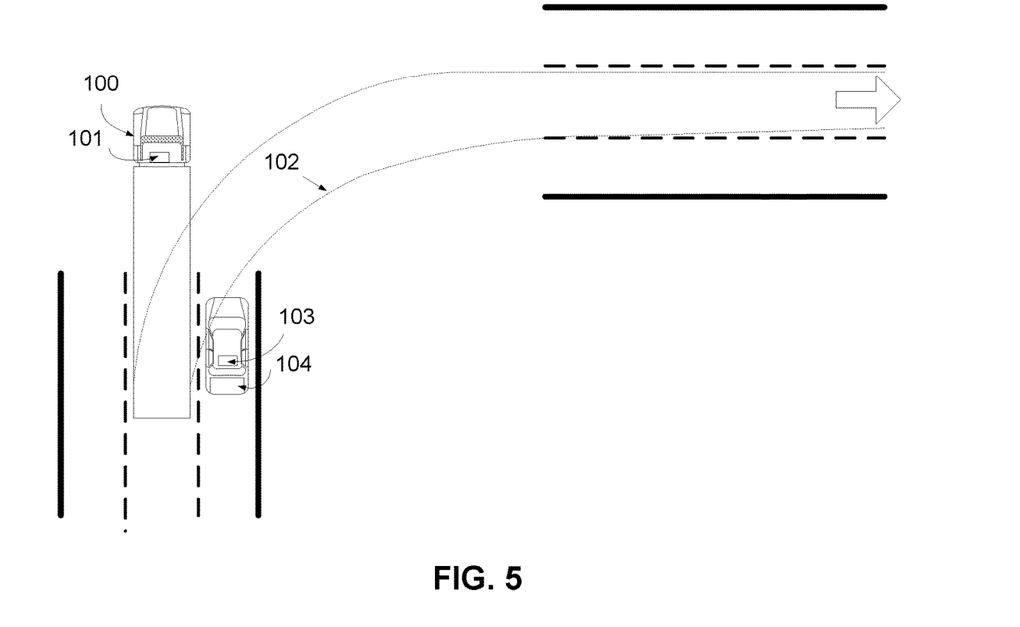
FIG. 5 is a schematic showing an expected truck's path during a turning maneuver that may collide with a vehicle in a lane adjacent to the truck and inside of the truck's turn.
Figure 6:
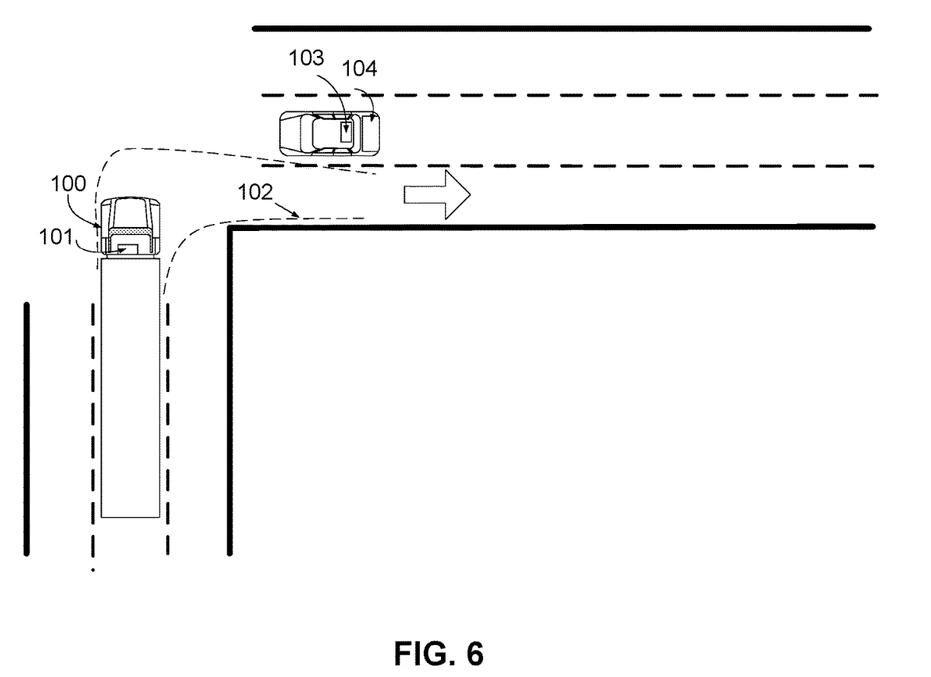
FIG. 6 is an expected truck's turning path during a turning maneuver that may collide with a vehicle.

As shown in FIG. 4, a vehicle 104 (such as a car or small vehicle relative to the truck 100) is equipped with a communication system 103, which includes a DSRC radio 112 and a DSRC antenna 111, with the DSRC radio 112 communicating with an Electronic Control Unit (ECU) 113. A forward facing camera 115 is disposed at the vehicle (such as at and behind and viewing through the windshield of the vehicle) and is also in communication with the ECU 113. The ECU 113 is in communication (such as wired or wireless communication) with a vehicle bus of the vehicle 104, and communicates with a Human Machine Interface (HMI) 114a, a brake control module 114b and a steering control module 114c of the communication system 103. The determination of a potential collision may be based at least in part on the communicated data, the predicted paths of travel of the vehicle and truck, and processing of image data captured by the forward viewing camera (such as for situations of the types shown in FIGS. 5 and 6).

Figure 3:
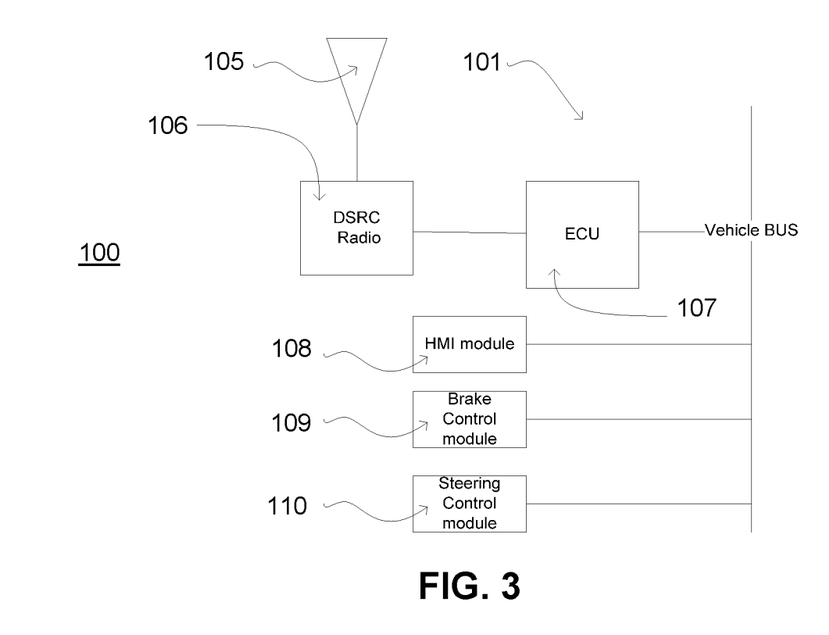
FIG. 3 is a block diagram showing a communication system having a DSRC radio with turn alert and brake system control installed in a truck in accordance with the present invention.

In one embodiment (such as shown in FIG. 3), the truck ECU 107 receives vehicle data from the other vehicle 104 via a DSRC link (between the radio 112 and antenna 111 and the radio 106 and antenna 105) and predicts the vehicle path and estimates the truck's path prediction utilizing the truck's vehicle data. A collision estimator of the truck utilizes the predicted path of the truck and the predicted path of the vehicle and estimates the collision probability. If the collision probability exceeds a threshold level, the system alerts the driver of the truck (utilizing the HMI interface 108) of the potential collision. Optionally, if the probability of collision exceeds a second threshold level (which is representative of a greater probability of imminent collision), the system 101 may activate the brakes of the truck and/or may control the steering of the truck to avoid or prevent collision with the nearby vehicle. Optionally, the determination of the probability of collision may be based at least in part on processing of image data captured by a camera of the truck, such as a forward viewing camera (such as disposed at and viewing through a windshield of the cab of the truck for viewing forward so as to capture image data of a vehicle or scene ahead of the truck, such as for situations of the type shown in FIG. 6) or a sideward viewing camera (such as disposed at a side of the cab or trailer of the truck and viewing sideward and/or rearward and/or forward so as to encompass a location where a vehicle may be present as the truck turns in front of the vehicle, such as for situations of the type shown in FIG. 5).

Figure 7:
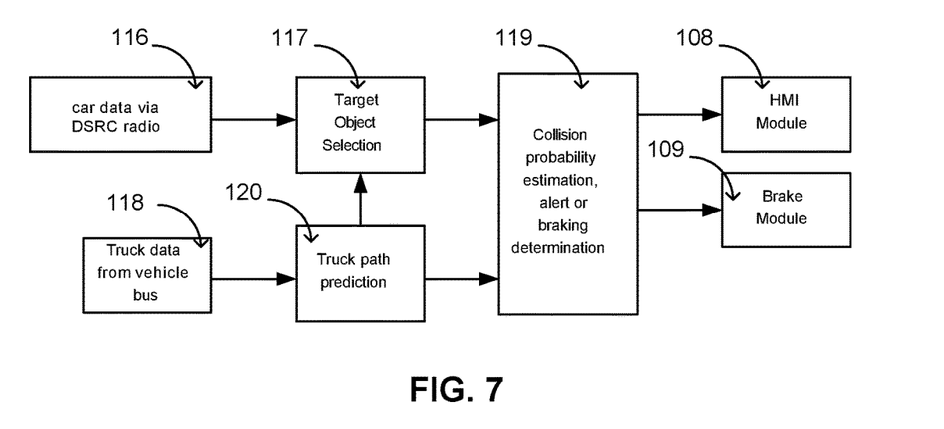
FIG. 7 is a data flow diagram of an algorithm in the truck in accordance with the present invention.

Thus, and such as shown in FIG. 7, the truck system may receive the vehicle data via the DSRC radio at 116 and may select the target object at 117. The truck data is received from the vehicle bus at 118 and the system determines or predicts a path of travel of the truck at 120. The system determines or estimates the probability of collision at 119, and determines if an alert is sufficient or if braking or steering is needed to assist in avoiding collision with the vehicle. The system may then generate an output to the HMI module 108 and/or the brake module 109 and/or the steering system 110 to alert the truck driver and/or control or maneuver the truck to avoid collision with the vehicle.

Optionally, and such as shown in FIG. 4, a vehicle ECU 113 of the car or vehicle 104 receives the truck data from the truck via a DSRC link (between the radio 106 and antenna 105 and the radio 112 and antenna 111) and predicts the truck's path and estimates the vehicle's path prediction utilizing the vehicle's vehicle data. A collision estimator of the vehicle utilizes the predicted path of the truck and the predicted path of the vehicle and estimates the collision probability. If the collision probability exceeds a threshold level, the system alerts the driver of the vehicle (utilizing the HMI interface 114a) of the potential collision. Optionally, if the probability of collision exceeds a second threshold level (which is representative of a greater probability of imminent collision), the system 103 may activate the brakes of the vehicle and/or may control the steering of the vehicle to avoid or prevent collision with the nearby truck.

Figure 8:
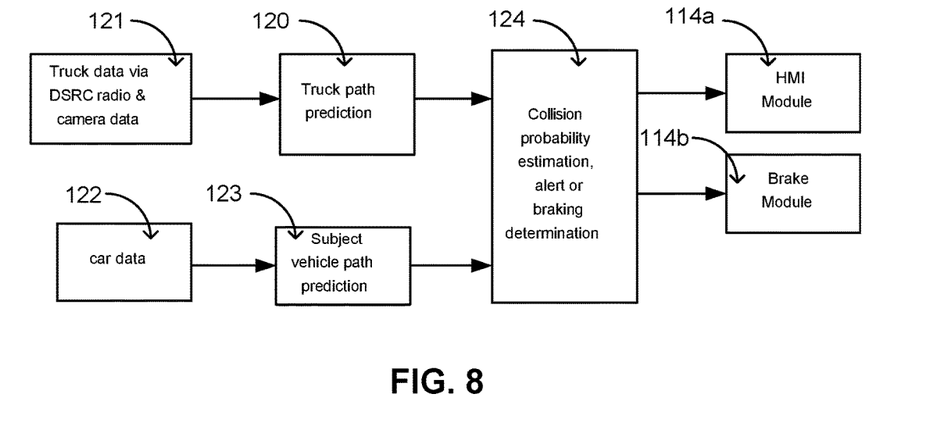
FIG. 8 is a data flow diagram of an algorithm executed in the vehicle in accordance with the present invention.

Thus, and such as shown in FIG. 8, the vehicle system may receive the truck data via the DSRC radio at 121 and may determine or predict the truck path of travel at 120. The vehicle data is received at 122 and the system determines or predicts a path of travel of the vehicle at 123. The system determines or estimates the probability of collision at 124, and determines if an alert is sufficient or if braking or steering is needed to assist in avoiding collision with the truck. The system may then generate an output to the HMI module 114a and/or the brake module 114b and/or the steering system 114c to alert the vehicle driver and/or control or maneuver the vehicle to avoid collision with the truck.

Therefore, the present invention comprises a vehicle system that utilizes a DSRC communication to transmit or communicate vehicle or truck information or data (indicative of a predicted or projected path of travel of the vehicle or truck) to a system or processor of another vehicle, where the system or processor of the other vehicle may, based on its own projected path of travel, determine if there may be a collision with the vehicle or truck. Thus, if a truck-based system receives a short range communication from a nearby vehicle system and, responsive to processing of vehicle data received from the vehicle system and responsive to truck data indicative of the projected path of the truck, the system may determine if the truck (such as if turning in a direction towards the side of the truck at which the vehicle is located) may collide with the vehicle during the turning maneuver. If such a potential collision is determined likely to occur, the system may alert the driver of the truck and/or may maneuver or control the truck (such as by controlling the steering of the truck and/or the brake system of the truck) to avoid collision with the vehicle.

Optionally, if a vehicle-based system receives a short range communication from a nearby truck system and, responsive to processing of truck data received from the truck system and responsive to vehicle data indicative of the projected path of the vehicle, the system may determine if the truck (such as if the truck is turning in a direction towards the side of the truck at which the vehicle is located) may collide with the vehicle during the turning maneuver. If such a potential collision is determined likely to occur, the system may alert the driver of the vehicle and/or may maneuver or control the vehicle (such as by controlling the steering of the vehicle and/or the brake system of the vehicle) to avoid collision with the turning truck.

Optionally, the communication between the car and truck may comprise other communication means or protocols, such as via car2car or vehicle to vehicle (V2V) and vehicle-to-infrastructure (car2X or V2X or V2I or 4G or 5G a broadband cellular network) technology or the like. Optionally, the system may also communicate with other systems, such as via a vehicle-to-vehicle communication system or a vehicle-to-infrastructure communication system or the like. Such car2car or vehicle to vehicle (V2V) and vehicle-to-infrastructure (car2X or V2X or V2I or 4G or 5G a broadband cellular network) technology provides for communication between vehicles and/or infrastructure based on information provided by one or more vehicles and/or information provided by a remote server or the like. Such vehicle communication systems may utilize aspects of the systems described in U.S. Pat. Nos. 6,690,268; 6,693,517 and/or 7,580,795, and/or U.S. Publication Nos. US-2017-0254873; US-2017-0158133; US-2014-0375476; US-2014-0218529; US-2013-0222592; US-2012-0218412; US-2012-0062743; US-2015-0251599; US-2015-0158499; US-2015-0124096; US-2015-0352953; US-2016-0036917 and/or US-2016-0210853, which are hereby incorporated herein by reference in their entireties.

The system may utilize sensors, such as radar or lidar sensors or the like. The sensing system may utilize aspects of the systems described in U.S. Pat. Nos. 8,027,029; 8,013,780; 6,825,455; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication No. WO 2011/090484 and/or U.S. Publication No. US-2010-0245066, which are hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EyeQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The camera system or camera module of the present invention may utilize aspects of the systems and/or modules described in International Publication Nos. WO 2013/123161 and/or WO 2013/019795, and/or U.S. Pat. Nos. 8,256,821; 7,480,149; 7,289,037; 7,004,593; 6,824,281; 6,690,268; 6,445,287; 6,428,172; 6,420,975; 6,326,613; 6,278,377; 6,243,003; 6,250,148; 6,172,613 and/or 6,087,953, and/or U.S. Publication Nos. US-2015-0327398; US-2014-0226012 and/or US-2009-0295181, which are all hereby incorporated herein by reference in their entireties. Optionally, the vision system may include a plurality of exterior facing imaging sensors or cameras, such as a rearward facing imaging sensor or camera, a forwardly facing camera at the front of the vehicle, and sideward/rearward facing cameras at respective sides of the vehicle, which capture image data representative of the scene exterior of the vehicle.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos.

US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or U.S. Publication Nos. US-2012-0162427; US-2006-0050018 and/or US-2006-0061008, which are all hereby incorporated herein by reference in their entireties. Optionally, the vision system (utilizing the forward facing camera and a rearward facing camera and other cameras disposed at the vehicle with exterior fields of view) may be part of or may provide a display of a top-down view or bird's-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A communication system for vehicles, said communication system comprising:

a first communication device disposed at a first vehicle, said first communication device wirelessly transmitting data indicative of a predicted path of travel of the first vehicle;

a second communication device disposed at a second vehicle, said second communication device receiving the wirelessly transmitted data from said first communication device;

wherein one of the first and second vehicles comprises a truck comprising a cab and a multi-axle trailer;

wherein said first and second communication devices comprise first and second dedicated short range communication (DSRC) devices;

a control of the second vehicle, wherein said control (i) processes data indicative of the predicted path of travel of the first vehicle that is wirelessly transmitted from said first communication device at the first vehicle and received at said second communication device at the second vehicle, and (ii) processes data indicative of a predicted path of travel of the second vehicle;

wherein, responsive to processing data indicative of the predicted path of travel of the first vehicle and processing data indicative of the predicted path of travel of the second vehicle, said control determines a potential collision between the first vehicle and the second vehicle during a turning maneuver of the truck toward the other of the first and second vehicles; and wherein, responsive to determination of a likelihood of collision between the first vehicle and the second vehicle, said control generates an alert to a driver of the second vehicle.

2. The communication system of claim 1, comprising an exterior viewing camera of the first vehicle, wherein said first communication device wirelessly transmits image data captured by said exterior viewing camera, and wherein the determination of a potential collision between the first vehicle and the second vehicle is based at least in part on processing by said control of received captured image data.

3. The communication system of claim 1, comprising an exterior viewing camera of the second vehicle, wherein the determination of a potential collision between the first vehicle and the second vehicle is based at least in part on processing by said control of received image data captured by said exterior viewing camera.

4. The communication system of claim 1, wherein the first vehicle is a car and the second vehicle is the truck.

5. The communication system of claim 4, wherein said control determines a potential collision between the first vehicle and the second vehicle when the truck is making a turning maneuver towards a region occupied by the car or in the predicted path of travel of the car.

6. The communication system of claim 1, wherein the second vehicle is a car and the first vehicle is the truck.

7. The communication system of claim 6, wherein said control determines a potential collision between the first vehicle and the second vehicle when the truck is making a turning maneuver towards a region occupied by the car or in the predicted path of travel of the car.

8. The communication system of claim 1, wherein, responsive to determination of a likelihood of collision between the first vehicle and the second vehicle, said control controls the brake system and/or steering of the second vehicle.

9. The communication system of claim 1, wherein the predicted path of travel of the first vehicle is determined based on the current steering angle of the first vehicle.

10. The communication system of claim 1, wherein the predicted path of travel of the second vehicle is determined based on the current steering angle of the second vehicle.

11. A communication system for vehicles, said communication system comprising:

a first communication device disposed at a truck comprising a cab and a multi-axle trailer, said first communication device wirelessly transmitting data indicative of a predicted path of travel of the truck;

a second communication device disposed at a vehicle, said second communication device receiving the wirelessly transmitted data from said first communication device;

a forward viewing camera of the vehicle captures image data representative of the scene forward of the vehicle;

wherein said first and second communication devices comprise first and second dedicated short range communication (DSRC) devices;

a control of the vehicle, wherein said control processes (i) data indicative of the predicted path of travel of the truck that is wirelessly transmitted from said first communication device, (ii) data indicative of a predicted path of travel of the vehicle, and (iii) image data captured by said forward viewing camera to determine a potential collision between the truck and the vehicle during a turning maneuver of the truck toward and at least partially in front of the vehicle; and wherein, responsive to determination of a likelihood of collision between the truck and the vehicle, said control generates an alert to a driver of the vehicle.

12. The communication system of claim 11, wherein said control determines a potential collision between the truck and the vehicle when the truck is making a turning maneuver towards a region occupied by the vehicle or in the predicted path of travel of the vehicle.

13. The communication system of claim 11, wherein, responsive to determination of a likelihood of collision between the truck and the vehicle, said control controls the brake system and/or steering of the vehicle.

14. The communication system of claim 11, wherein the predicted path of travel of the truck is determined based on the current steering angle of the truck, and wherein the predicted path of travel of the vehicle is determined based on the current steering angle of the vehicle.

15. The communication system of claim 11, wherein an exterior viewing camera is disposed at the truck, and wherein said first communication device wirelessly transmits image data captured by said exterior viewing camera, and wherein the determination of a potential collision between the truck and the vehicle is based at least in part of processing by said control of received image data captured by said exterior viewing camera at the truck.

16. A communication system for vehicles, said communication system comprising:

a first communication device disposed at a vehicle, said first communication device wirelessly transmitting data indicative of a predicted path of travel of the vehicle;

a second communication device disposed at a truck comprising a cab and a multi-axle trailer, said second communication device receiving the wirelessly transmitted data from said first communication device;

an exterior viewing camera of the truck captures image data representative of the scene exterior of the truck;

wherein said first and second communication devices comprise first and second dedicated short range communication (DSRC) devices;

a control of the truck, wherein said control processes (i) data indicative of the predicted path of travel of the vehicle received from said first communication device, (ii) data indicative of a predicted path of travel of the truck, and (iii) image data captured by said exterior viewing camera to determine a potential collision between the truck and the vehicle during a turning maneuver of the truck toward and at least partially in front of the vehicle; and wherein, responsive to determination of a likelihood of collision between the truck and the vehicle, said control generates an alert to a driver of the truck.

17. The communication system of claim 16, wherein said control determines a potential collision between the truck and the vehicle when the truck is making a turning maneuver towards a region occupied by the vehicle or in the predicted path of travel of the vehicle.

18. The communication system of claim 16, wherein, responsive to determination of a likelihood of collision between the truck and the vehicle, said control controls the brake system and/or steering of the truck.

19. The communication system of claim 16, wherein the predicted path of travel of the truck is determined based on the current steering angle of the truck, and wherein the predicted path of travel of the vehicle is determined based on the current steering angle of the vehicle.

20. The communication system of claim 16, wherein a forward viewing camera is disposed at the vehicle, and wherein said first communication device wirelessly transmits image data captured by said forward viewing camera, and wherein the determination of a potential collision between the truck and the vehicle is based at least in part of processing by said control of received image data captured by said forward viewing camera.

* * * * *